No. 689,397. Patented Dec. 24, 1901.
W. H. HODGES.
FOLDING POULTRY COOP.
(Application filed Sept. 23, 1901.)

(No Model.) 2 Sheets—Sheet 1.

Witnesses: Inventor
W. H. Hodges
Atty.

No. 689,397. Patented Dec. 24, 1901.
W. H. HODGES.
FOLDING POULTRY COOP.
(Application filed Sept. 23, 1901.)
(No Model.) 2 Sheets—Sheet 2.
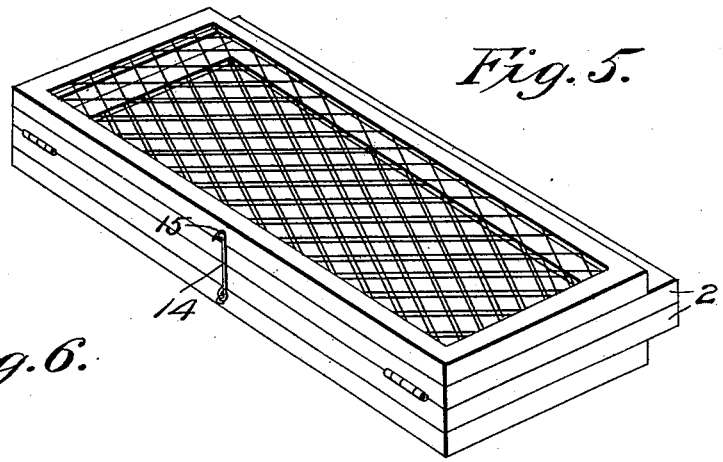
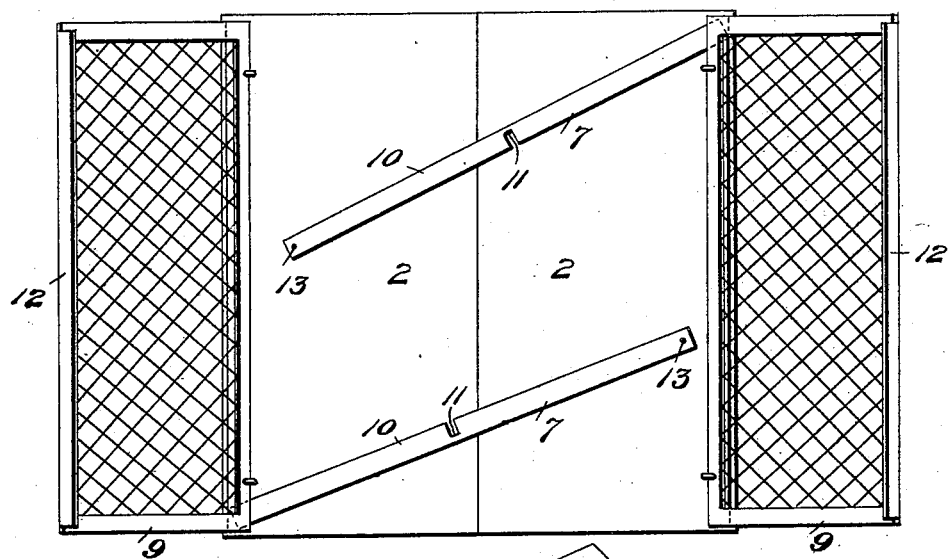
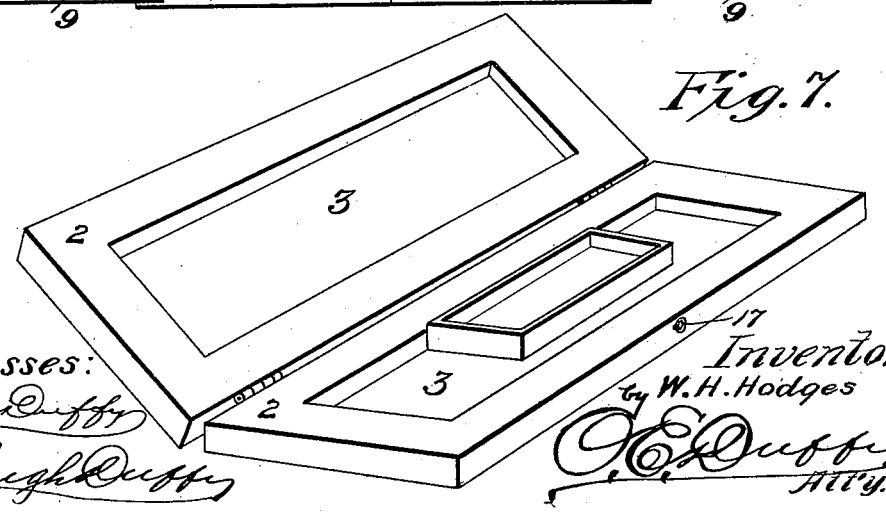
Witnesses: Inventor
W. H. Hodges
Att'y.

UNITED STATES PATENT OFFICE.

WILLIAM H. HODGES, OF UNION STAR, MISSOURI.

FOLDING POULTRY-COOP.

SPECIFICATION forming part of Letters Patent No. 689,397, dated December 24, 1901.

Application filed September 23, 1901. Serial No. 76,258. (No model.)

*To all whom it may concern:*

Be it known that I, WILLIAM H. HODGES, a citizen of the United States, residing at Union Star, in the county of Dekalb and State of Missouri, have invented certain new and useful Improvements in Folding Poultry-Coops; and I do hereby declare the following to be a full, clear, and exact description of the invention, such as will enable others skilled in the art to which it appertains to make and use the same.

My invention relates to "knockdown crates," but more particularly to poultry-coops, and has for its object to provide a folding coop which will combine cheapness of manufacture, ease of operation, strength, lightness, durability, and compactness for transportation.

With all these objects in view my invention consists in the twofold utilization of the folding bottom.

My invention also consists in the novel manner of fastening the coop when in an operative position.

My invention also consists in certain other novel features of construction and in combination of parts, which will be first fully described and afterward specifically pointed out in the appended claims.

Figure 1:
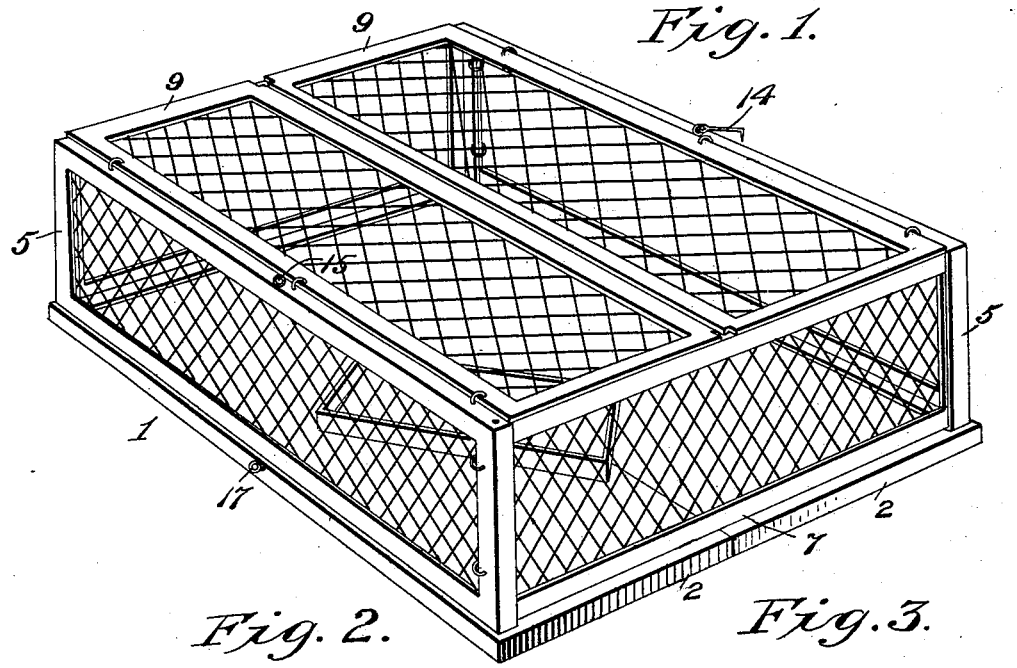
Figures 2, 3, 4:
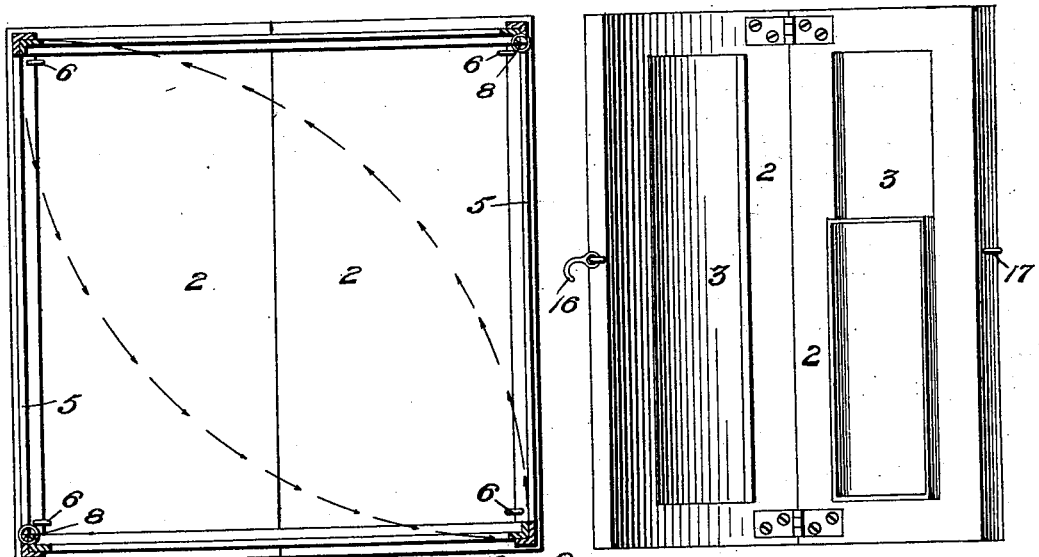

Referring to the accompanying drawings, Figure 1 is a perspective view of my poultry-coop in operative position. Fig. 2 is a horizontal section through the same. Fig. 3 is a perspective view of the bottom. Fig. 4 is a vertical cross-section through the center of Fig. 1. Fig. 5 is a perspective view of my coop in a folded position. Fig. 6 is a top plan showing coop partly in position. Fig. 7 is a perspective of the bottom, showing manner of carrying pans, &c.

Like numerals of reference indicate the same parts throughout the several figures, in which—

1 is the coop, composed of the double-sectioned folding bottom 2, each of said sections being recessed at 3, as shown in Figs. 3, 4, and 7.

5 indicates the sides, which are hinged to the bottom sections 2 at 6.

7 indicates the ends, which are hinged to the sides 5 at 8 and which fold back on said sides, as indicated by the arrows in Fig. 2, and which are shown partly folded back in Fig. 6.

9 indicates the top sections, which are hinged to the sides 5, as shown in Figs. 1, 4, and 6. Said top sections fold down on the sides 5 after the ends 7 have been folded back, as described.

I provide the tops 10 of the ends 7 with a notch 11, and I provide the top sections 9 with downwardly-projecting flanges 12, as shown in Fig. 4. When the coop is opened and in position, said flanges 12 enter said notches 11, which securely holds the entire coop in position and prevents the same from accidentally folding up. To further secure the same, however, I provide the ends 7 with small holes 13 in the tops thereof, and I also provide the top of the sides 5 with similar holes at the corners of the tops. When, therefore, the coop is set up, the holes in the ends 7 register directly below the holes in the sides 5, and a nail dropped in said holes will securely lock the coop in position.

On the tops of the sides 5 I provide a hook 14 and an eye 15, and on the outer edges of the bottom sections I provide another hook 16 and eye 17, which are used when the coop is in a folded position, as shown in Fig. 5.

Having thus described the several parts of my invention, its operation is as follows: The coop being in position as shown in Fig. 1, the top sections are thrown back and each end folded in against the sides. The top sections are then folded down and over the ends, the flanges on said top sections entering under the bottom of the sides, as shown by arrows in Fig. 4, thus securely holding the ends in a folded position and forming a very neat and compact arrangement. The feed or watering pans are then removed from the floor of bottom and placed in the recess in one of said bottom sections, as shown in Fig. 7. Said sections are then folded together, thus forming a receptacle for the feed or watering pans. The bottom sections are then fastened together with the hook and eye, and the sides carrying the ends and top sections are folded down on the bottom sections and securely fastened in position with the hook and eye, as shown in Fig. 5. The coop is now in position for transportation. In order to set it up, however, the above operation is reversed.

Having thus described my invention, I do not wish to be understood as limiting myself to the exact construction set forth, as various slight changes may be made therein by those skilled in the art which would fall within the limit and scope of my invention, and I consider myself clearly entitled to all such changes and modifications.

What I claim as new, and desire to secure by Letters Patent of the United States, is—

1. In a folding poultry-coop, the combination of a folding bottom recesses in the under sides thereof, sides hinged to said bottom, ends hinged to said sides, flanges on said sides, notches in said flanges, top sections hinged to said sides, flanges on said top sections adapted to register with said notches when in an open position, and to enter under said sides when in a folded position, substantially as described.

2. In a folding poultry-coop, the combination of a folding bottom, recesses in the under sides thereof thereby forming a receptacle for feed or watering pans, sides secured to said bottom, ends and top sections secured to said sides, flanges on said sides, ends and top sections holes in the flanges of said sides and ends, whereby the coop may be securely held in an extended position by inserting an object in said holes, substantially as described.

3. In a folding poultry-coop, the combination of a folding bottom, composed of sections, recesses in the under sides thereof, and arranged whereby a receptacle is formed when said sections are folded back upon themselves, sides secured to said bottom, ends secured to said sides, top sections secured to said sides, and means for securely holding said coop in an extended position, substantially as described.

4. In a folding poultry-coop, the combination of a folded bottom, recesses formed therein sides secured to said bottom, ends and top sections secured to said sides, flanges in said ends and top sections and arranged whereby said flanges engage one another and securely hold the coop in an extended position, substantially as described.

In testimony whereof I affix my signature in presence of two witnesses.

WILLIAM H. HODGES.

Witnesses:
SALFELD BATEMAN,
CHAS. FURON.